United States Patent
Pande et al.

(10) Patent No.: US 7,831,550 B1
(45) Date of Patent: Nov. 9, 2010

(54) PROPAGATING RESULTS OF A VOLUME-CHANGING OPERATION TO REPLICATED NODES

(75) Inventors: Arvind Arun Pande, Aundh (IN); Saurabh Ramchandra Godbole, Maharashtra (IN); Anand A. Kekre, Baner (IN)

(73) Assignee: Symantec Operating Corporation, Mountain View, CA (US)

( * ) Notice: Subject to any disclaimer, the term of this patent is extended or adjusted under 35 U.S.C. 154(b) by 520 days.

(21) Appl. No.: 10/675,505

(22) Filed: Sep. 30, 2003

(51) Int. Cl.
*G06F 17/00* (2006.01)

(52) U.S. Cl. .................................................. 707/610

(58) Field of Classification Search ................. 707/201, 707/202, 203, 204, 610, 638, 640, 641, 674; 714/6, 100, 107; 711/162
See application file for complete search history.

(56) References Cited

U.S. PATENT DOCUMENTS

| | | | |
|---|---|---|---|
| 6,035,412 A * | 3/2000 | Tamer et al. | 714/6 |
| 6,578,041 B1 * | 6/2003 | Lomet | 707/102 |
| 6,615,223 B1 * | 9/2003 | Shih et al. | 707/201 |
| 6,662,197 B1 * | 12/2003 | LeCrone et al. | 707/204 |
| 6,728,898 B2 * | 4/2004 | Tremblay et al. | 714/6 |
| 7,107,589 B1 * | 9/2006 | Tal et al. | 717/177 |
| 7,567,991 B2 * | 7/2009 | Armangau et al. | 707/203 |
| 2003/0208511 A1 * | 11/2003 | Earl et al. | 707/204 |
| 2005/0278393 A1 * | 12/2005 | Huras et al. | 707/202 |

* cited by examiner

*Primary Examiner*—John R. Cottingham
*Assistant Examiner*—Robert Timblin
(74) *Attorney, Agent, or Firm*—Campbell Stephenson LLP

(57) ABSTRACT

A method, system, and computer-readable medium to quickly synchronize copies of data that have diverged over time. The present invention can be used in synchronizing replicated copies of data that have become unsynchronized due to the restoration of primary data from a backup copy of the primary data. The solution enables copies of data to be synchronized without copying all of the data from one copy to another. The solution uses minimal resources to maintain data consistency and has minimal effect on performance of applications using the data and on network usage. The method includes determining that a change occurred to data in a region of a primary volume without including the region in a set of regions designated for replication to a secondary volume. The region is added to the set of regions designated for replication to the secondary volume and replicated.

16 Claims, 14 Drawing Sheets

Synchronized

Snapshot Made

Updates To Primary Volume And Snapshot Volume

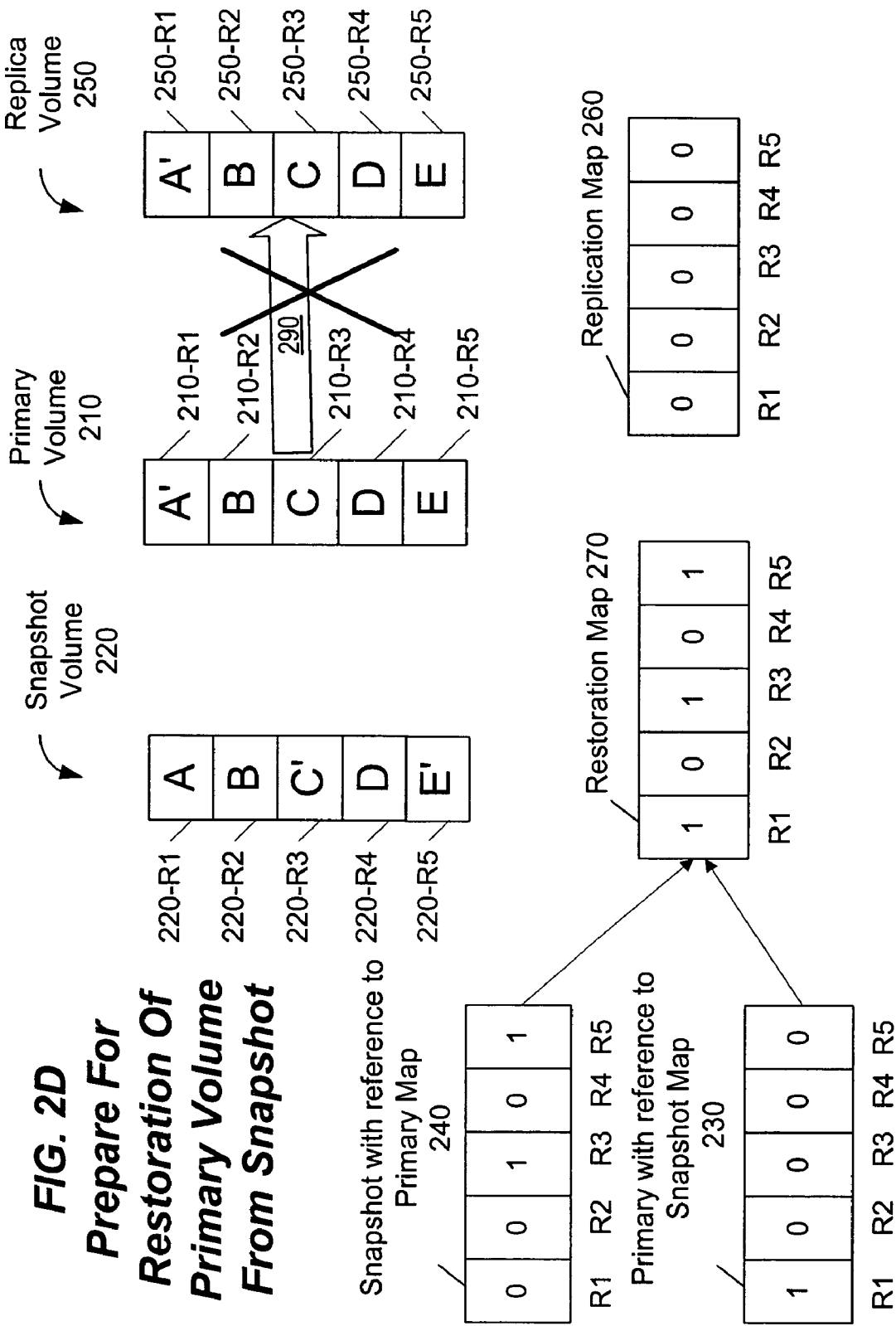

Restore
Primary Volume
From Snapshot

Initialize Replication Map

Copy To Replica

After Synchronization

PROPAGATING RESULTS OF A VOLUME-CHANGING OPERATION TO REPLICATED NODES

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

BACKGROUND OF THE INVENTION

Information drives business. For businesses that increasingly depend on data and information for their day-to-day operations, unplanned downtime due to data loss or data corruption can hurt their reputations and bottom lines. Businesses are becoming increasingly aware of these costs and are taking measures to plan for and recover from data loss. Often these measures include protecting primary, or production, data, which is 'live' data used for operation of the business. Copies of primary data are made on different physical storage devices, and often at remote locations, to ensure that a version of the primary data is consistently and continuously available.

Typical uses of copies of primary data include backup, Decision Support Systems (DSS) data extraction and reports, testing, and trial failover (i.e., testing failure of hardware or software and resuming operations of the hardware or software on a second set of hardware or software). These copies of data are preferably updated as often as possible so that the copies can be used in the event that primary data are corrupted, lost, or otherwise need to be restored. Ensuring data consistency is critical to maintaining highly available data. The terms "consistent" and "consistency" are used herein to describe a backup copy of primary data that is either an exact copy of the primary data or an exact copy of primary data as the primary data existed at a previous point in time, which is referred to herein as a "snapshot."

Two areas of concern when a hardware or software failure occurs, as well as during the subsequent recovery, are preventing data loss and maintaining data consistency between primary and backup data storage areas. One simple strategy to achieve these goals includes backing up data onto a storage medium such as a tape, with copies stored in an offsite vault. Duplicate copies of backup tapes may be stored onsite and offsite. However, recovering data from backup tapes requires sequentially reading the tapes. Recovering large amounts of data can take weeks or even months, which can be unacceptable in today's 24×7 business environment.

Other types of data storage areas take form as one or more physical devices, such as one or more dynamic or static random access storage devices, one or more magnetic or optical data storage disks, or one or more other types of storage devices. With respect to backup copies of primary data, preferably the backup storage devices are direct access storage devices such as disks rather than sequential access storage devices such as tapes. Because disks are often grouped to form a logical storage volume that is used to store backup copies of primary data, the term "storage area" is used interchangeably herein with "storage volume;" however, one of skill in the art will recognize that the systems and processes described herein are also applicable to other types of storage areas and that the use of the term "storage volume" is not intended to be limiting. A storage volume is considered to be made up of regions. A storage volume storing the primary data is referred to herein as a primary volume, and a storage area storing a backup copy of the primary data is referred to herein as a backup volume or a secondary volume. A storage volume storing a snapshot of the primary data is referred to herein as a snapshot volume. A node in a network managing the primary data/volume is referred to herein as a primary node, and a node in the network maintaining backup copies of the primary data but not the primary data itself is referred to herein as a secondary node.

One way to achieve consistency and avoid data loss is to ensure that every update made to the primary data is also made to the backup copy, preferably in real time. However, when a primary volume becomes corrupted and the result of the update corrupting the primary data is propagated to backup volumes, "backing out" the corrupted data and restoring the primary data to a previous state is required on every copy of the data that has been made. Previously, this problem has been solved by restoring the primary volume from a snapshot volume made before the primary data were corrupted. Once the primary volume hosting the primary data is restored, the entire primary volume is copied to each backup volume to ensure consistency between the primary data and backup copies. Only then can normal operations, such as updates and replication, of the primary volume resume.

One reason that the entire primary volume is copied to each backup location is that some applications, such as database applications, require that the updates made to the primary data are made to the backup copy of the primary data in the same order. For example, consider a database maintaining an inventory of 20 items. Assume that an order is received for 15 items, updating the number of items in inventory to 5. Assume then that an order is received for 7 items, 5 items are shipped to fulfill the order, updating the number of items in inventory to 0, and the remaining 2 items are placed on back order. If the backup copy of the inventory also starts with 20 items, and the order for 7 items is applied first, the backup copy is updated to reflect an inventory of 13 items, which is a state never reached in the primary data. If at this point, the primary data were corrupted, and the backup copy showing an inventory of 13 items is used to restore the primary data, data about the correct number of items in inventory are lost.

To maintain a backup copy that ensures write ordering without copying the entire primary volume to each backup location, one technique is to send each update to another instance of the database application on the secondary node, and the secondary instance of the database application can apply the updates in order to the copy of the primary data maintained on the secondary node. However, maintaining duplicate application resources at the secondary nodes can be inefficient, particularly when the secondary nodes serve only as backup storage locations for the primary data.

The previously-described technique of copying the entire primary volume solves the write-ordering problem and enables the corrupted primary-data to be restored on every backup copy without requiring that secondary nodes be used to re-process the updates to the data. However, copying the entire primary volume to each secondary volume uses network bandwidth unnecessarily when only a small subset of the primary data has changed. Furthermore, copying the entire primary volume across a network requires a significant amount of time to establish a backup copy of the data, especially when large amounts of data, such as terabytes of data, are involved. All of these factors delay the resumption of normal operations and can cost companies a large amount of money due to downtime.

What is needed is the ability to quickly synchronize copies of a single source of data that have diverged over time. The solution should enable copies of data to be synchronized without copying all of the data from one valid copy to each invalid copy, and yet maintain consistency of data without requiring duplicate resources at each secondary node. The solution should use minimal resources to maintain data consistency and have minimal effect on performance of applications using the data and on network usage.

SUMMARY OF THE INVENTION

The present invention includes a method, system, and computer-readable medium to quickly synchronize copies of data that have diverged over time. The present invention can be used, for example, in synchronizing replicated copies of data that have become unsynchronized due to the restoration of primary data from a backup copy of the primary data. The solution enables copies of data to be synchronized without copying all of the data from one copy to another. The solution uses minimal resources to maintain data consistency and has minimal effect on performance of applications using the data and on network usage.

In one embodiment, a method includes determining that a change occurred to data in a region of a primary volume without including the region in a set of regions designated for replication to a secondary volume. In one embodiment, the change occurs as a result of restoring at least one region of the primary volume from a third volume. The third volume can be a snapshot of the primary volume at one point in time. The region is added to the set of regions designated for replication to the secondary volume and replicated. Replication of the affected regions can be performed while the restoration operation is taking place and without disrupting the replication process. Thus, the primary and secondary volumes can be synchronized after a volume-changing operation such as restoration without copying all data from the primary volume to the secondary volume.

BRIEF DESCRIPTION OF THE DRAWINGS

The present invention may be better understood, and its numerous objectives, features, and advantages made apparent to those skilled in the art by referencing the accompanying drawings.

FIGS. 2A through 2H, collectively referred to as FIG. 2, show steps in a data flow when data are restored and replicated in accordance with one embodiment of the invention.

FIG. 2A shows an initial state of the data prior to a restoration operation.

FIG. 2B shows the state of the data immediately after a snapshot of the primary volume of FIG. 2A is taken.

FIG. 2C shows the state of all volumes and maps of FIG. 2B after write operations have been performed on the primary volume and the snapshot volume.

FIG. 2D shows preparation for the restoration process.

FIG. 2E shows the restoration process and the state of the data immediately after the restore operation completes.

FIG. 2F shows initialization of the replication map of FIGS. 2A through 2E.

FIG. 2G shows copying the changed regions indicated in the replication map of FIG. 2F from the primary volume to the replica volume.

FIG. 2H shows the final state of the replica volume after the regions identified in the replication map are synchronized with the primary volume.

The use of the same reference symbols in different drawings indicates similar or identical items.

DETAILED DESCRIPTION

Figure 1:
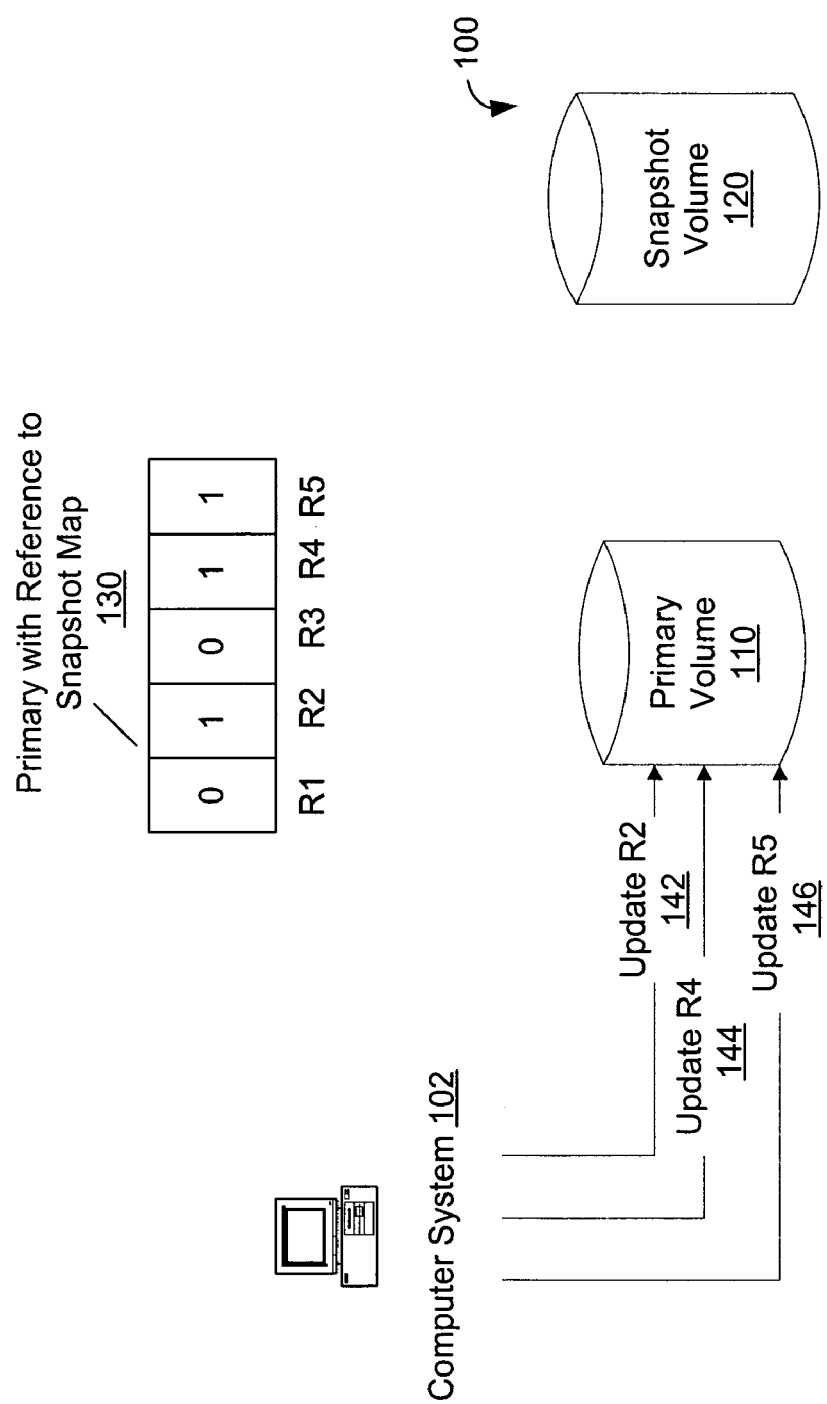
FIG. 1 shows a map for tracking changes in primary data with respect to a snapshot of the primary data taken at a given point in time.

For a thorough understanding of the subject invention, refer to the following Detailed Description, including the appended Claims, in connection with the above-described Drawings. Although the present invention is described in connection with several embodiments, the invention is not intended to be limited to the specific forms set forth herein. On the contrary, it is intended to cover such alternatives, modifications, and equivalents as can be reasonably included within the scope of the invention as defined by the appended Claims.

In the following description, for purposes of explanation, numerous specific details are set forth in order to provide a thorough understanding of the invention. It will be apparent, however, to one skilled in the art that the invention can be practiced without these specific details.

References in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Introduction

The present invention provides a method, system, and computer-readable medium to quickly synchronize copies of data that diverged over time, particularly as a result of a restoration operation of one copy of the data from another copy of the data. The solution enables copies of data to be synchronized without copying all of the data from one copy to another. The solution uses minimal resources to maintain data consistency and has minimal effect on performance of applications using the data and on network usage.

In one embodiment, a method includes determining that a change occurred to data in a region of a primary volume without including the region in a set of regions designated for replication to a second volume, where the change occurred as a result of restoring at least one region of the primary volume from a third volume. The third volume can be a snapshot of the primary volume at one point in time. The region is added to the set of regions designated for replication to the second volume and replicated to the second volume. Replication of the region can be performed while the restoration operation is taking place and without disrupting the replication process.

When data in a region is changed by an application managing data in the region, the region can be designated for replication in several ways. For example, a region can be added to a log (or journal) of changes to regions, where each region having a change in the log is replicated. This type of designation occurs during normal application updates to the data in the region. Regions can also be designated for replication when a change occurs to the region but the region cannot be added to the log of changes to regions. Such a situation can occur, for example, when the log of changes to regions becomes full. In addition, regions can be designated for replication when it is determined that the region is one of a set of pending regions in the log that has not yet been replicated. The present invention identifies regions that have not been designated for replication in any of the above-mentioned ways and replicates those regions in addition to the other designated regions. As a result of this selective replication, primary and secondary volumes are synchronized without copying all data from one volume to the other.

Various techniques have been developed to speed the synchronization process of two or more inconsistent sets of data. One technique involves taking a snapshot of primary data at a given point in time, and then tracking regions changed in the primary data with reference to the snapshot. Only the changed regions are copied to synchronize the snapshot with the primary data. One such technique is described in further detail in U.S. patent application Ser. No. 10/254,753, filed on Sep. 25, 2002, entitled "Method and Apparatus for Restoring a Corrupted Data Volume," and naming Anand A. Kekre, John A. Colgrove, Oleg Kiselev, and Ronald S. Karr as inventors, the application being incorporated herein by reference in its entirety and for all purposes. This technique is available in the VERITAS Volume Manager® product, in addition to another technique that creates third-mirror-breakoff snapshots.

The technique referred to above identifies the regions changed during restoration of a primary volume from a snapshot volume using bitmaps, also referred to herein as maps, with the data divided into regions and each bit in the bitmap corresponding to a particular region of the data volume. Each bit is set to logical 1 (one) if a change to the data in the respective region has been made, and thus the bitmaps are sometimes referred to as data change maps. If the data have not changed, the respective bit is set to logical 0 (zero). Only those regions having a bit set to one are copied to synchronize inconsistent sets of data. One of skill in the art will recognize that the functionality of a bitmap can be provided by other types of data structures; for example, the data may be stored as a table or other data structure that can be used to track changes made to a given region of one storage area with reference to a corresponding region of another storage area.

FIG. 1 provides an example of a storage environment 100 in which computer system 102 hosts an application (not shown) that manages primary data on primary volume 110. Snapshot volume 120 contains a snapshot of the primary data at a previous point in time. Computer system 102 processes instructions or transactions that perform updates to primary data. Each of primary volume 110 and snapshot volume 120 is shown as including five regions, region 1 (R1) through region 5 (R5) for purposes of illustration. Three updates to primary data on primary volume 110 are shown in the order in which the updates are made, including an update to region 2 (R2) in update 142, an update to region 4 (R4) in update 144, and an update to region 5 (R5) in update 146. When the updates are made, respective bits corresponding to respective regions R2, R4, and R5 are set to have a value of one in "primary with reference to snapshot" map 130 to indicate the regions that have changed in primary data on primary volume 110 since snapshot 120 was made. Each bit having a value of one in map 130 indicates that the respective region is unsynchronized between primary volume 110 and snapshot volume 120. To synchronize the two volumes, those respective regions must be copied from one volume to the other. Bits in a data change map such as map 130 can be automatically updated when each update to a region of primary volume 110 is performed.

The changes tracked by map 130 can then be applied in either direction. For example, the changes can be applied to the snapshot when there is a need for the snapshot to reflect the current state of the primary data. For example, after updates 142, 144, and 146 are made to regions 2, 4, and 5 of primary volume 110, regions 2, 4, and 5 of snapshot volume 120 are no longer synchronized with the corresponding regions 2, 4, and 5 of primary volume 110. These changes can be accomplished by copying the contents of primary volume 110 regions 2, 4, and 5 to regions 2, 4, and 5 of snapshot volume 120. The region(s) to be copied can be quickly determined by examining map 130.

Alternatively, to return to a previous state of the data before updates 142, 144, and 146 were made, the changed portion (regions 2, 4, and 5) of primary data on primary volume 110 can be restored from (copied from) regions 2, 4 and 5 of snapshot volume 120. The changes made in updates 142, 144, and 146 are thereby "backed out" without copying all of the data from snapshot volume 120.

Replication of data to secondary nodes typically occurs with each update to primary data. When primary volume 110 is restored from snapshot volume 120 as described above, corrupted primary data may have already been replicated to secondary nodes when the restoration takes place. After data have been restored on the primary volume, a need exists to restore the corrupted data that has been replicated to the secondary volumes. Operations such as restoration are not captured during the normal replication process because they are not the result of an application-driven update operation. To resynchronize the primary and secondary volumes after an operation such as restoration occurs, common practice is to copy the entire primary volume to each backup volume.

Figure 2A:
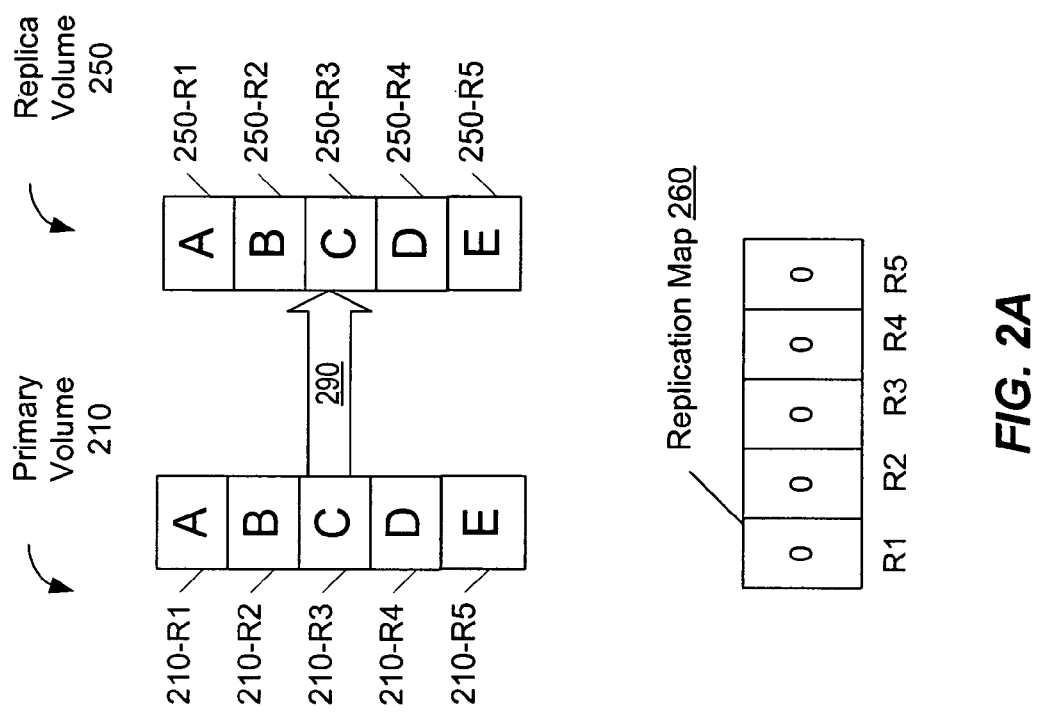

FIGS. 2A through 2G, collectively referred to as FIG. 2, show steps in a data flow when data are restored and replicated in accordance with one embodiment of the invention. FIG. 2A shows an initial state of the data prior to a restoration operation. In FIG. 2A, each region of primary volume 210 is represented by one of regions 210-R1, 210-R2, 210-R3, 210-R4, and 210-R5. FIG. 2A also shows a replica volume 250, with each region 250-R1 through 250-R5 being a replica of a respective region 210-R1 through 210-R5 in primary volume 210. In FIG. 2A, replica volume 250 represents the state of the data at the time initial synchronization with primary volume 210 is performed, when the contents of the primary and replica volumes 210 and 250 are identical. Note that, while a storage region typically contains many bytes of data, the contents of each region are represented by a single character for illustration purposes.

Normal replication is in progress, as indicated by the replication link 290 between primary volume 210 and replica volume 250. Replication map 260 is a data change map used by the replication process to indicate when a particular region has been changed but not captured by the normal replication process to replica volume 250. Replication map 260 is clear (all bits are set to zero) because all regions of replica volume 250 have been replicated from primary volume 210.

Figure 2B:
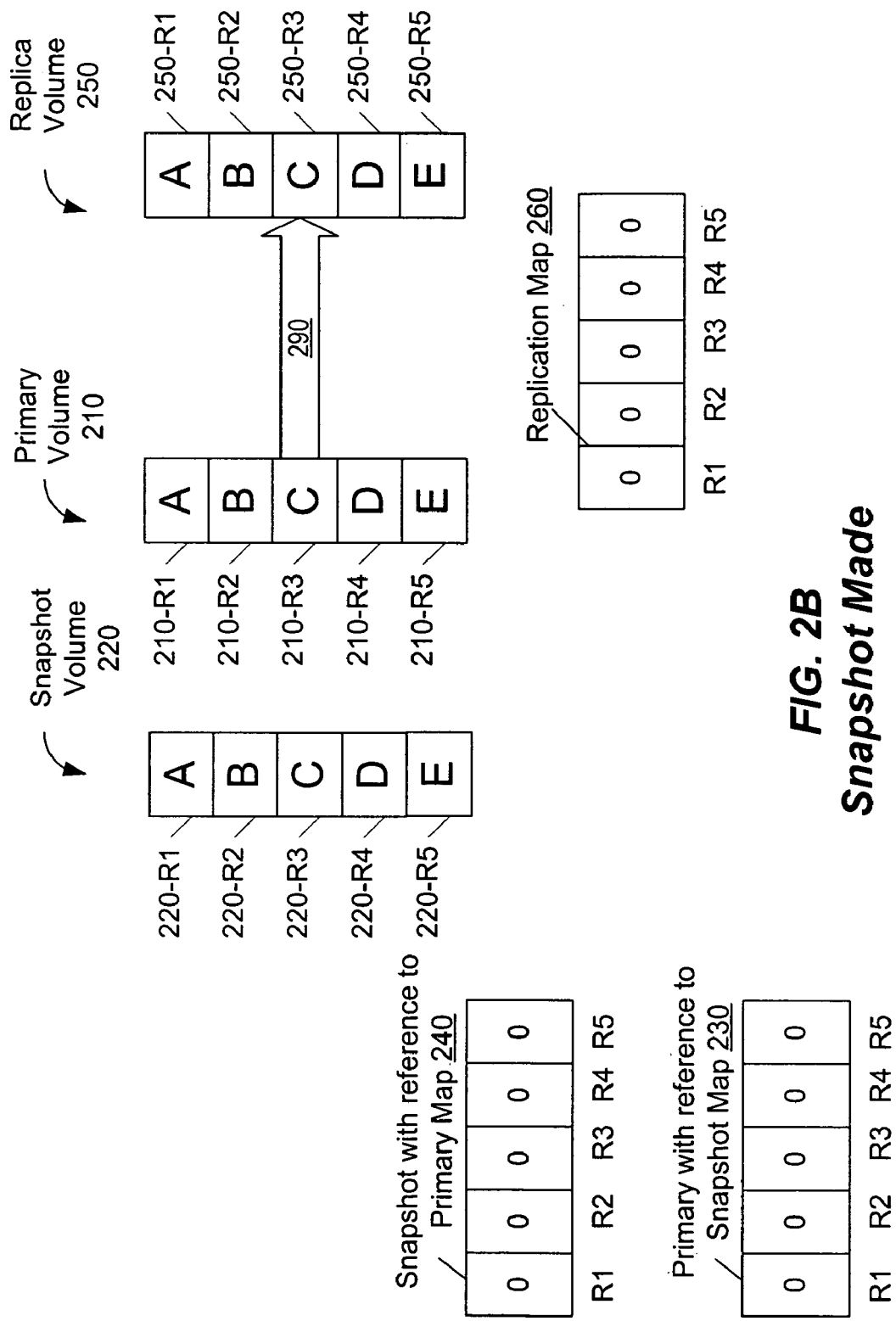

FIG. 2B shows the state of the data immediately after a snapshot 220 of primary volume 210 is taken. Snapshot volume 220 is a point-in-time image of primary volume 210. Each of regions 220-R1 through 220-R5 of snapshot volume 220 is identical to respective region 210-R1 through 210-R5 of primary volume 210. Two data change maps are associated with snapshot volume 220. "Primary with reference to Snapshot" map 230 tracks changes in primary volume 210 after the point in time at which snapshot volume 220 was made, and "snapshot with reference to primary" map 240 tracks changes in snapshot volume 220 after the point in time that snapshot volume 220 was made. For example, data can be written to snapshot volume 220 when snapshot volume 220 is a "writeable" snapshot. Maps 230 and 240 are initially clear, with all region bits set to zero, indicating the primary volume 210 and snapshot volume 220 are identical.

Figure 2C:
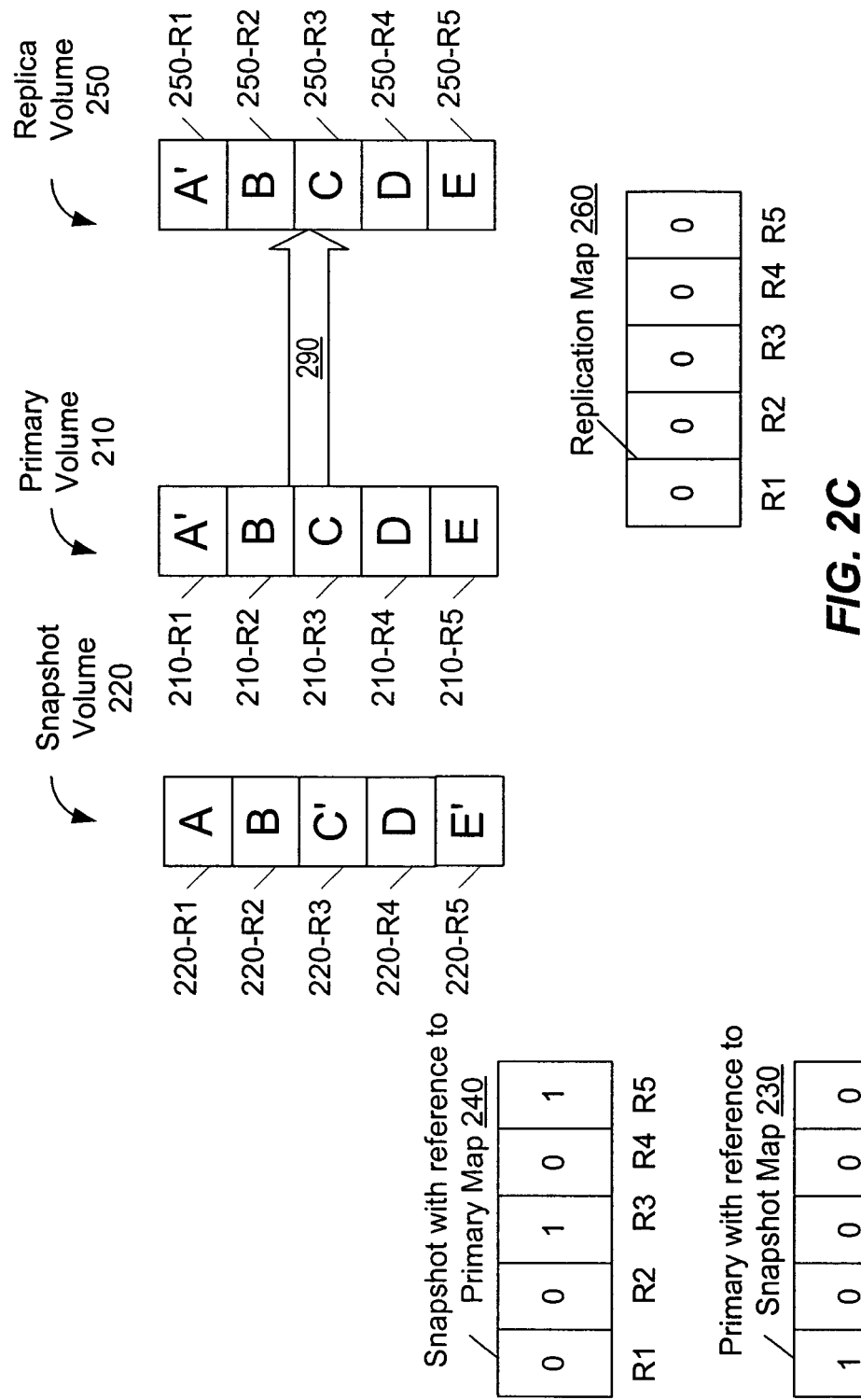

FIG. 2C shows the state of all volumes and maps of FIG. 2B after write operations have been performed on primary volume 210 and snapshot volume 220. A write operation to region 210-R1 on primary volume 210 has changed the data in region 210-R1 from A to A'. Since primary volume 210 is a replicated volume, the change to region 210-R1 was immediately replicated to respective region 250-R1 of replica volume 250, causing data in respective region 250-R1 to also change to A'. Write operations to snapshot volume 220 to regions 220-R3 and 220-R5 have changed the respective data values from C and E to C' and E'. At this point, data in snapshot volume 220 and primary volume 210 have diverged. This divergence is noted in respective maps 240 and 230. Regions R3 and R5 are designated for subsequent synchronization in map 240, and region R1 is designated for subsequent synchronization in map 230.

FIG. 2D shows preparation for the restoration process. Assume that an administrator notices data corruption (either due to user error causing a logical corruption or some other technical fault) and begins to prepare to restore the data in primary volume 210 from data in the snapshot volume 220. Replication link 290 can be shut down prior to restoration of primary volume 210 from snapshot volume 220, although it is possible to continue replication during the restoration process. Three regions (1, 3 and 5) are designated for subsequent synchronization between the two volumes, as indicated by maps 230 and 240. Each of these regions must be copied. The results of the two maps 230 and 240 are combined to form restoration map 270, which indicates the regions to be synchronized during the restoration. Replica volume 250 is an image of primary volume 210 on the primary node, so the same three regions are different between replica volume 250 and primary volume 210.

Figure 2E:
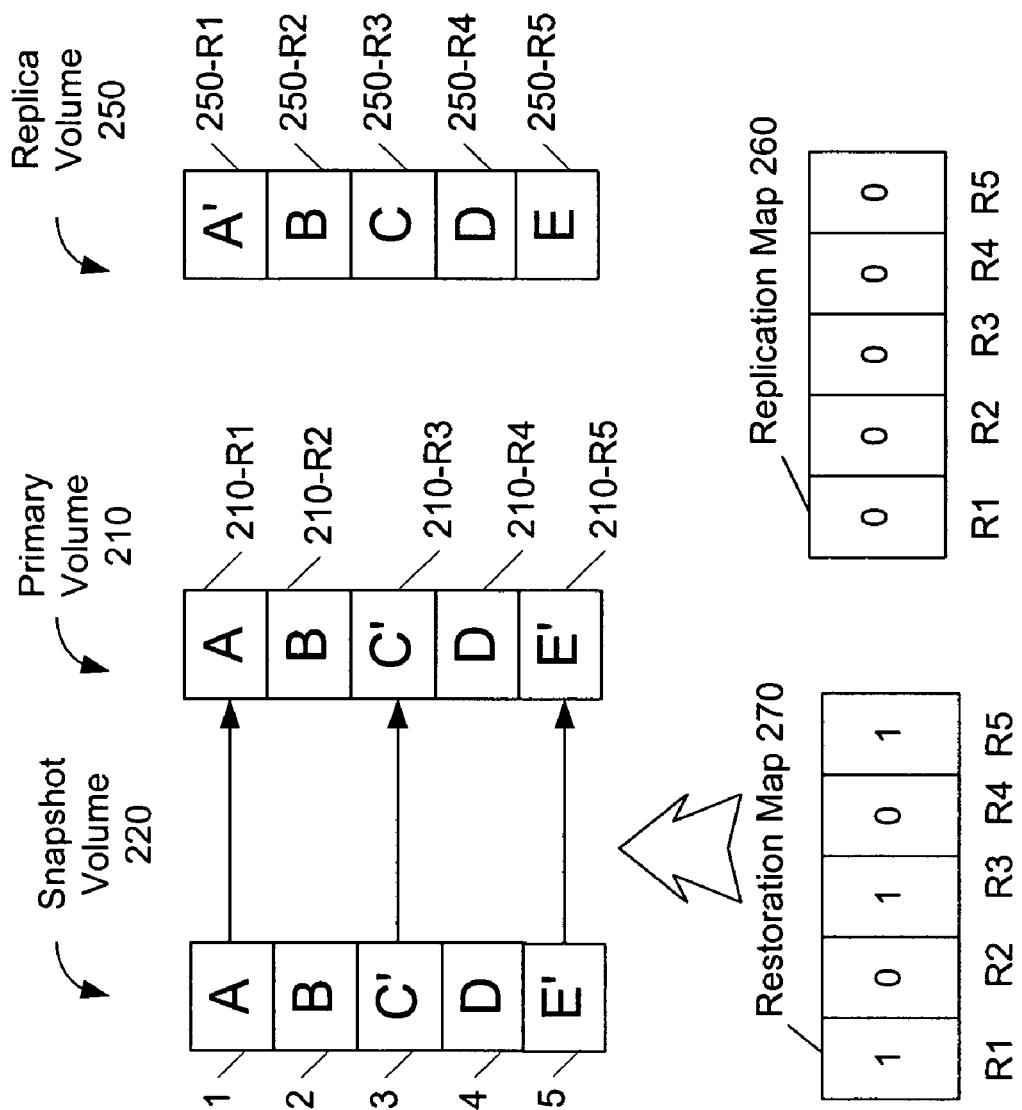

FIG. 2E shows the restoration process and the state of the data immediately after the restore operation completes. Restoration map 270 is used to synchronize the regions between primary volume 210 and snapshot volume 220. Note that the regions need not be physically copied from volume 220 to volume 210 to make the restore operation complete, as described in U.S. patent application Ser. No. 10/254,753, filed on Sep. 25, 2002, entitled "Method and Apparatus for Restoring a Corrupted Data Volume," and naming as inventors Anand A. Kekre, John A. Colgrove, Oleg Kiselev, and Ronald S. Karr, the application being incorporated by reference herein in its entirety for all purposes. As described in the aforementioned application, the volume can be assumed to be restored once a multi-column bitmap has been manipulated, as described therein. Once the restore operation is assumed to be complete, logically the data in primary volume 210 are identical to the data in snapshot volume 220, but these changes have not yet been propagated to replica volume 250. Restoration map 270 indicates the regions that need to be synchronized with replica volume 250. Since these regions have not been updated by the application, they are not designated for replication and must be replicated for the replica volume 250 to be synchronized with primary volume 210.

As a result of an application changing the data on the data volume, the regions can be designated for replication in several ways. For example, a region can be added to a log of changes to regions, where each region having a change in the log is replicated during the normal update and replication process. Regions can also be designated for replication when a change occurs to the data in the region, but the region cannot be added to the log of changes to regions. Such a situation can occur, for example, when the log of changes to regions becomes full. The regions affected by such changes after the log becomes full can be marked in replication map 260, as those regions are not replicated by the normal replication process. Regions marked in replication map 260 can be copied, or replicated, from one volume to another to synchronize the volumes without copying all data for all regions.

In addition, regions can be designated for replication when it is determined that a region is one of a set of pending regions in the log that has not yet been replicated and normal replication is not being performed. These regions can also be marked in replication map 260 to designate that these regions must be synchronized.

Figure 2F:
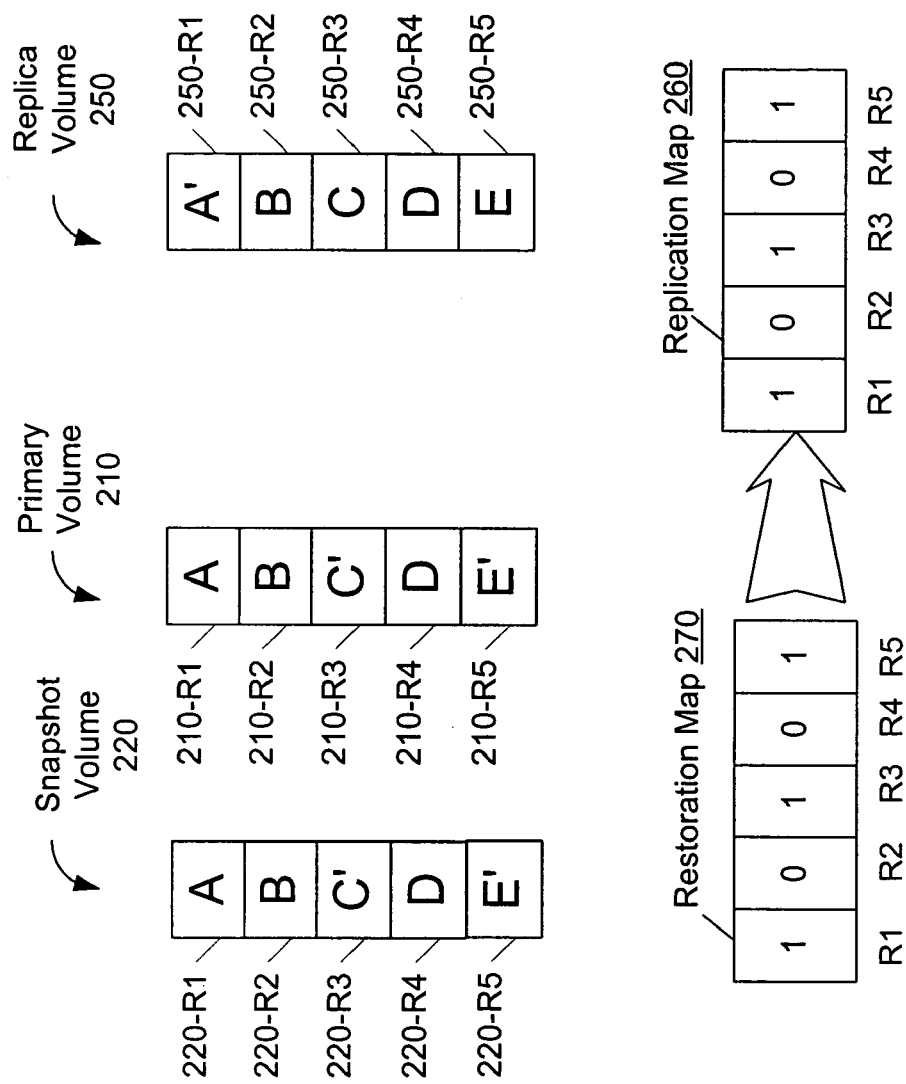

FIG. 2F shows initialization of the replication map 260 by copying restoration map 270. The changed regions marked in replication map 260 are propagated during synchronization to replica volume 250 on the secondary node. If replication map 260 already has entries due to the failure to replicate some regions as described above, a logical OR operation can be performed on restoration map 270 and replication map 260 to produce an updated replication map that can then be used for synchronization of the volumes.

Figure 2G:
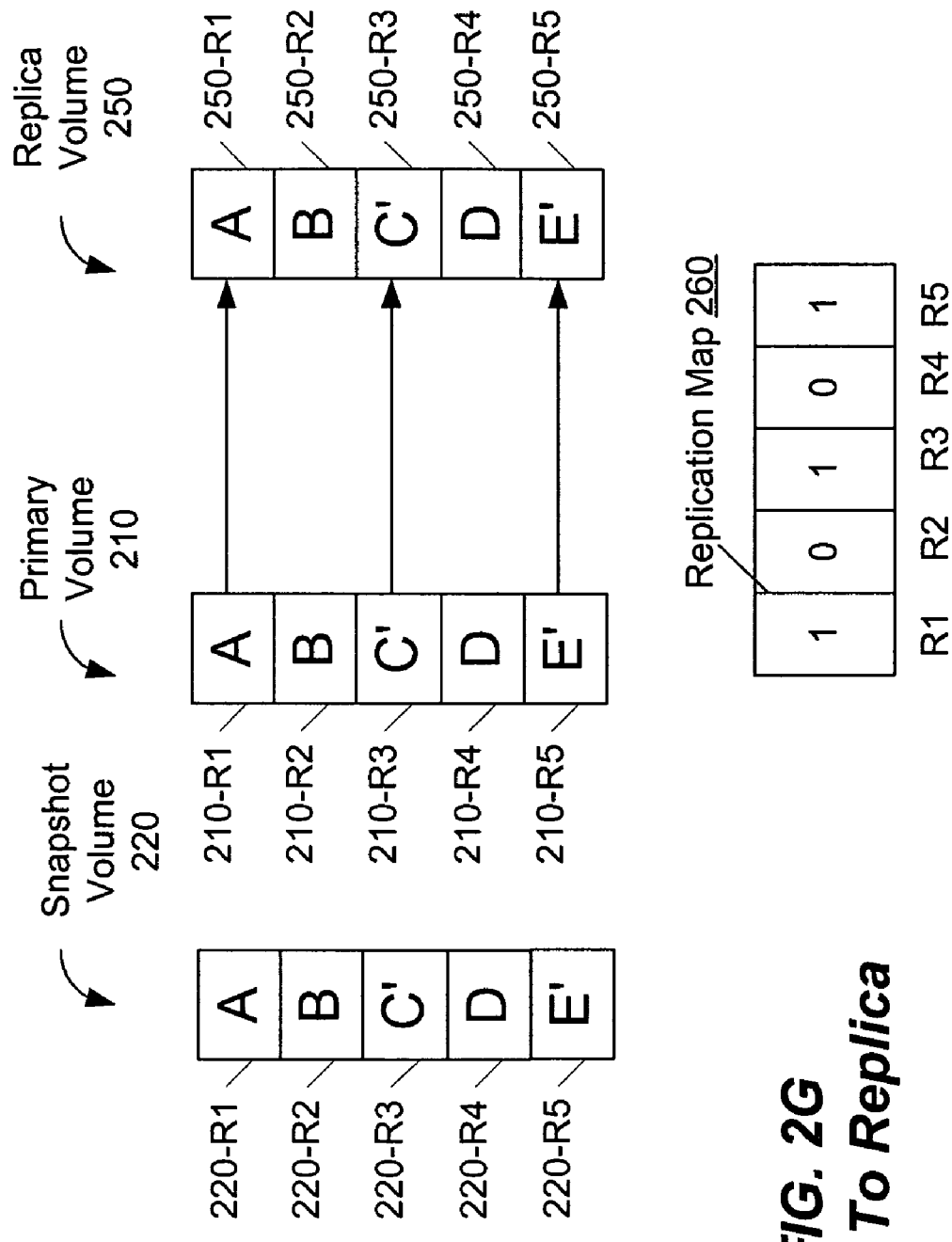

FIG. 2G shows copying the changed regions indicated in replication map 260 from primary volume 210 to replica volume 250. Only regions 1, 3, and 5 are copied to synchronize primary volume 210 and replica volume 250.

Figure 2H:
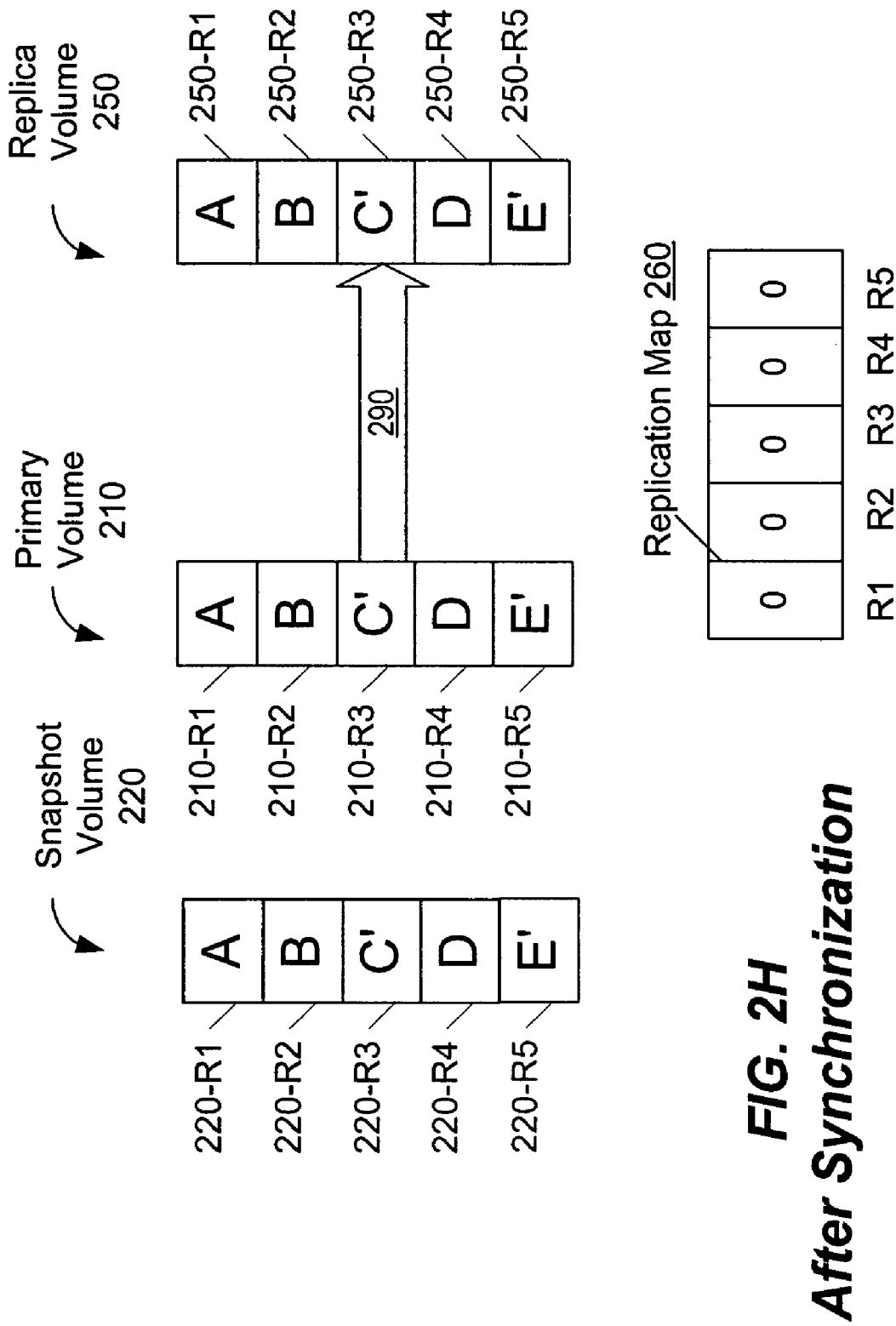

FIG. 2H shows the final state after regions 1, 3, and 5 of primary volume 210 are copied to replica volume 250. The changed regions are synchronized, replication map 260 is cleared, replication link 290 can be re-established if replication was stopped, and normal replication is again in progress.

Figure 3:
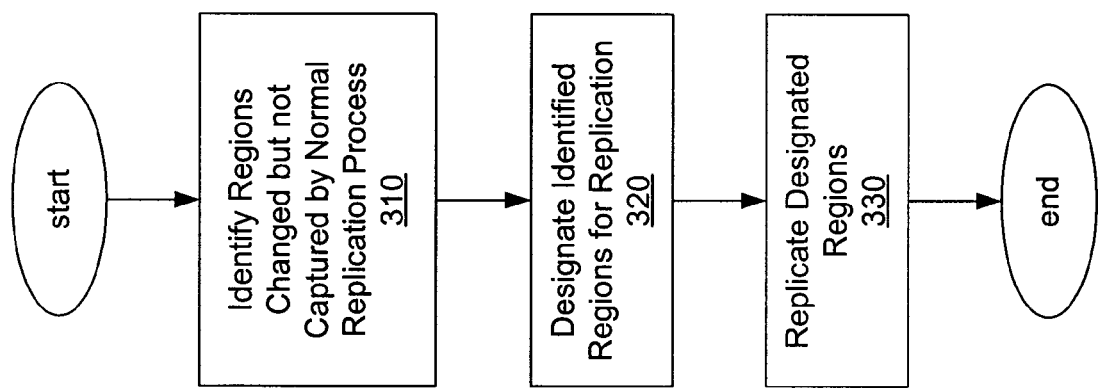
FIG. 3 shows a flowchart of a method for implementing one embodiment of the present invention.

FIG. 3 shows a flowchart of one embodiment of a method for synchronizing inconsistent sets of data in an environment where data are maintained in the form of snapshots and replicated to secondary nodes. In "Identify Regions Changed but not Captured by Normal Replication Process" step 310, regions are identified that have changed but not been designated for replication. For example, these regions include regions changed as a result of a restoration operation. In "Designate Identified Regions for Replication" step 320, the changed regions that were not captured during the normal replication process are designated for replication. For example, as described above, these regions can be marked in a replication map that is used for synchronization of volumes. In "Replicate Designated Regions" step 330, all regions designated for replication are replicated from the primary volume to the replica volume.

Restoration map 270 of FIG. 2D is one example of a way to determine whether a region of a volume has been updated without being captured during replication. If a region has changed that was not replicated, then that region will be unsynchronized among the various copies of the data. These types of changes can occur in volume-changing operations such as restoration of a primary volume from a snapshot, as captured in restoration map 270. If such a volume-changing operation maintains a list of the regions changed by the volume-changing operation, then using the list to synchronize only those regions enables the copies of the data to be synchronized quickly and efficiently.

Another way to determine whether a region of a volume has been updated but not captured by the normal replication process is to identify regions that changed, but for which replication was not completed. These changes are identified by replication map 260 described above with reference to FIG. 2. An example of a scenario in which replication may not be completed for some regions is described below with reference to FIG. 4.

Figure 4:
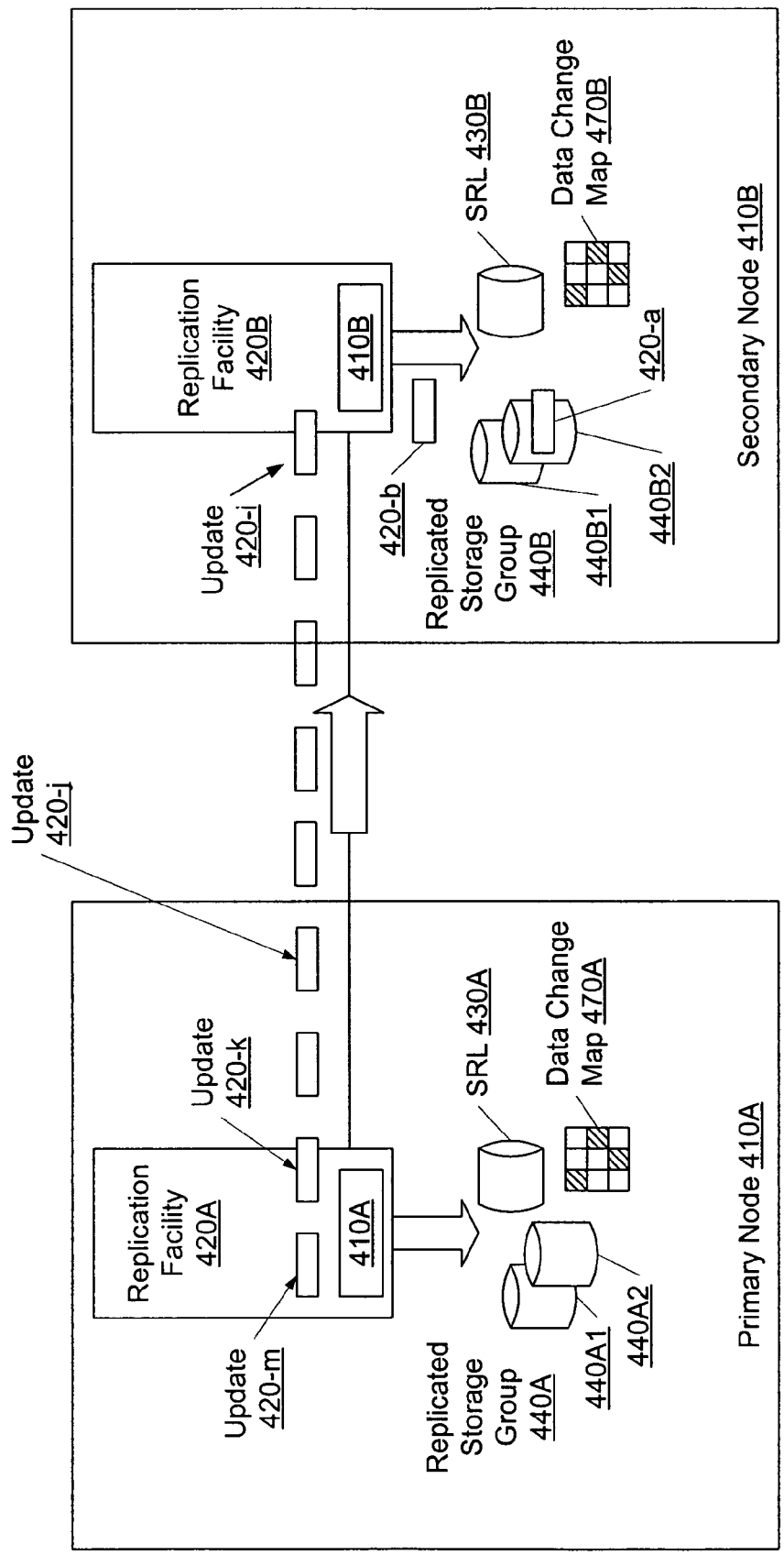
FIG. 4 shows operation of a replication facility for replicating a data stream from a primary node to a secondary node.

FIG. 4 shows operation of a replication facility for replicating a data stream from a primary node 440A to a secondary node 440B. The data stream includes multiple data units, each referred to as an update and labeled as update 420-$a$, update 420-$b$, and so on. Replication of the data stream begins when replication facility 420A of primary node 410A sends an update such as update 420-$a$ to secondary node 410B. Replication of the data stream is completed when replication facility 420B of secondary node 410B stores the last update, such as update 420-$k$, on the secondary node.

Each of primary node 410A and secondary node 410B includes one or more data storage areas on which data being replicated are stored. In the example of FIG. 4, these data storage areas are storage areas 440A1 and 440A2 of primary node 410A and storage areas 440B1 and 440B2 of secondary node 410B. FIG. 4 shows a point in time during replication when update 420-$a$ is being stored on the secondary node in data storage area 440B2.

Replication facility 420B receives and processes the replication stream from primary node 410A and may also replicate its data for other secondary nodes.

Replication Storage Groups

A set of data storage areas that are replicated as a unit is referred to herein as a replicated storage group (RSG), such as replication storage group 440A of FIG. 4. Storage areas in a replicated storage group are under the control of an application, such as a database application, that requires write-order fidelity among the updates to the storage areas. Write-order fidelity requires that updates to the different storage areas are made in the same order on each storage area. An application manages data in a primary replication storage group, such as RSG 440A. Replication facility 420A then replicates the data to one or more secondary replication storage groups, such as secondary RSG 440B, at secondary nodes. Write ordering is strictly maintained within a replication storage group during replication to ensure that each remote storage area is always consistent, both internally and with all other storage areas of the replication storage group. Storage areas that are associated with a replication storage group and contain application data are called application data storage areas.

Storage Replicator Log

In the embodiment shown in FIG. 4, each of primary node 410A and secondary node 410B also includes a storage replication log(SRL), such as SRL 430A and SRL 430B, for each replication storage group, respectively RSG 440A and RSG 440B. Updates to the data storage areas in the primary replication storage group 440A can be held in the storage replication log 430A on primary node 410A before being sent to secondary node 410B. In such an embodiment, each update to data in a replication storage group generates two write requests: one to a data storage area, and one to the storage replication log. For this reason, data storage areas and SRL storage areas are preferably configured on different physical disks to improve performance of the replication process.

In some embodiments, an SRL on a secondary node, such as SRL 430B on secondary node 110B, performs a different function than the function performed by the corresponding SRL of the primary node, here SRL 430A. Under normal operations, the secondary SRL is not used. However, when the replication system is recovering after a temporary failure in communication between the primary and secondary nodes or from a primary or secondary node failure, updates can be stored in the secondary SRL and applied together to maintain data consistency. Using the secondary SRL in this way ensures that the secondary node transitions from one consistent data state to another.

In an alternative embodiment, the secondary SRL, such as SRL 430B on secondary node 410B, can be used as the first data storage area during replication. For example, data received at the secondary node may be written first to the secondary SRL and then copied to data storage areas such as replication storage group 440B. In such an embodiment, a freeze of data on the secondary node temporarily suspends copying of the data to the data storage areas. Such an embodiment could be used, for example, to perform delayed replication.

Communication Links/Replication Links

In one embodiment of the invention, communication links between the primary and secondary nodes can be represented as communication link objects (not shown in FIG. 4). Communication link objects can be associated with replication storage groups. Each communication link object on a primary replication storage group, such as RSG 440A, represents the communication link from the primary replication storage group to a corresponding secondary replication storage group, such as RSG 440B. A communication link object on a secondary replication storage group represents the communication link from the secondary replication storage group to the corresponding primary replication storage group. A secondary node typically serves as a replication node for only one primary node and typically has one associated communication link object referencing its primary node. A primary replication storage group can have one or more associated communication link objects for secondary nodes. If a secondary node is "promoted" to assume the role of a primary node, then the newly-promoted node can have multiple communication link objects for other nodes that were previously secondary to the "demoted" primary node.

A primary communication link object reads data from the corresponding storage replication log(SRL) at the primary node and sends the data to the secondary node. Communication link objects in an replication storage group share the SRL at the primary node, and each communication link object reads data at its own rate. An update is removed from the SRL when all the communication link objects have successfully sent their respective updates to the secondary nodes. If a communication link object cannot store updates as quickly as they arrive, the communication link object may overflow and precautions must be taken to avoid losing the data that overflows.

Replication of data can be performed in synchronous mode, where the primary node waits for an acknowledgement from all secondary nodes that an update has been received before notifying the application that the write operation is complete. Alternatively, replication may be performed in asynchronous mode, where the primary node notifies the application that the write operation is complete when the data resulting from the write operation are written to a local storage replication log. The mode of replication can be set up for each communication link object, depending on the requirements for the specific application. Communication link objects in a replication storage group can be set to replicate in different modes.

To ensure disaster recovery, data loss must be prevented and consistent data maintained even if hardware or software failures occur. A replication storage group should not be allowed to enter a state in which the failure of the network or the primary node would leave that replication storage group in an inconsistent and unusable state. During normal operation, data loss can be prevented by logging all writes to the primary SRL and ensuring that this operation completes before attempting any writes to the primary and secondary data storage areas. Following this plan ensures that the primary SRL contains the true contents of the replication storage group. In most cases of failure, the primary SRL can be used to establish the correct contents of all data storage areas.

Data consistency is ensured by coordinating operations such that they occur in the same order on each secondary node as on the primary node. The primary SRL is time-ordered and contains the data for each individual update. Consequently, disk modifications occur in the same order on both the secondary and the primary node. If a primary or secondary node fails, recovery includes locating the last primary SRL entry that had not yet been acknowledged by the secondary node as having been successfully written before the failure. Operation can continue from that point. However, a window of requests may exist between the last acknowledged request and the last request that was sent to the replication storage group before the failure. The data in this window may or may not have been written to the secondary node data storage areas. To ensure the consistency of the secondary node, all the requests that were made during this window can be written as a single atomic unit, referred to as an atomic write. No read requests are allowed on the secondary node until the atomic write is complete. This requirement ensures that no application can access the replication storage group while its state is inconsistent:

Data Change Map

A Data Change Map (DCM) is an object that contains a bitmap, and can be optionally associated with a data storage area on the primary replication storage group. Examples of data change maps are shown in FIG. 4 as DCM 470A and DCM 470B. Each DCM 470A and 470B corresponds to replication map 260 of FIG. 2. Bits in the bitmap represent ranges of data that are different between the primary and the secondary nodes.

Under normal circumstances, updates, also referred to herein as writes, are sent to the secondary node in the order in which they are generated at the primary node. Consequently, the secondary node represents a state of the primary node at a given point in time. If the secondary node takes over due to a disaster, the data storage areas will be consistent.

A DCM is used when data at the secondary node have become inconsistent with data at the primary node. While a DCM is active, each bit that has been set in the DCM represents a region of the storage area that differs in content between the primary and secondary nodes. In the embodiment described herein, the DCM becomes active only when updates are unable to flow between the primary and secondary nodes, and the SRL is no longer large enough to hold accumulated updates. When the updates are able to flow from the primary to the secondary node, the administrator can use the replication facility to initiate a resynchronization to incrementally synchronize the secondary node with the primary node using the bitmap. Data at the secondary node are inconsistent with data on the primary node between the time the DCM resynchronization starts and completes, because write-order fidelity is not preserved. DCM synchronization is designed to operate as quickly as possible to provide the shortest possible time of inconsistency. After the resynchronization is complete (when all regions mapped in the DCM have been copied to the secondary node), the secondary replication storage group is consistent with the primary replication storage group and replication can continue as usual, subsequently maintaining write-order fidelity.

A DCM can be used to handle overflow of a storage replication log so that replicated data are not lost. Each data storage area in the replication storage group must have a valid DCM associated with that replication storage group before the DCM can be used.

In one embodiment of the invention, a replication facility performing replication to secondary nodes has a DCM logging and replay mode. In DCM logging and replay mode, a secondary volume is re-synchronized from the primary volumes by reading data from the regions that are indicated as changed in the DCM and copying only those regions to the secondary volume. Similarly to map 130 of FIG. 1, a DCM provides a convenient way to determine whether a region of a volume has been updated but not captured during replication. If a region has changed that was not replicated, then that region will be unsynchronized among the various copies of the data. These types of changes can occur during replication in situations such as overflow of a storage replication log. If a replication tracking operation maintains a list of the regions changed but for which replication did not complete, then using the list to synchronize only those regions enables the copies of the data to be synchronized quickly and efficiently without replicating all regions.

The functionality of a map tracking changes between primary data and a snapshot of the primary data, such as map 130 of FIG. 1, can be combined with a DCM to track changes between the primary data and a replicated volume, such as DCM 470A or 470B of FIG. 4. By combining the two maps, a more accurate determination of changes to a region not captured by the normal replication process can be made. These regions can be selectively synchronized to make all copies of the primary data, both local and replicated, consistent.

Figure 5:
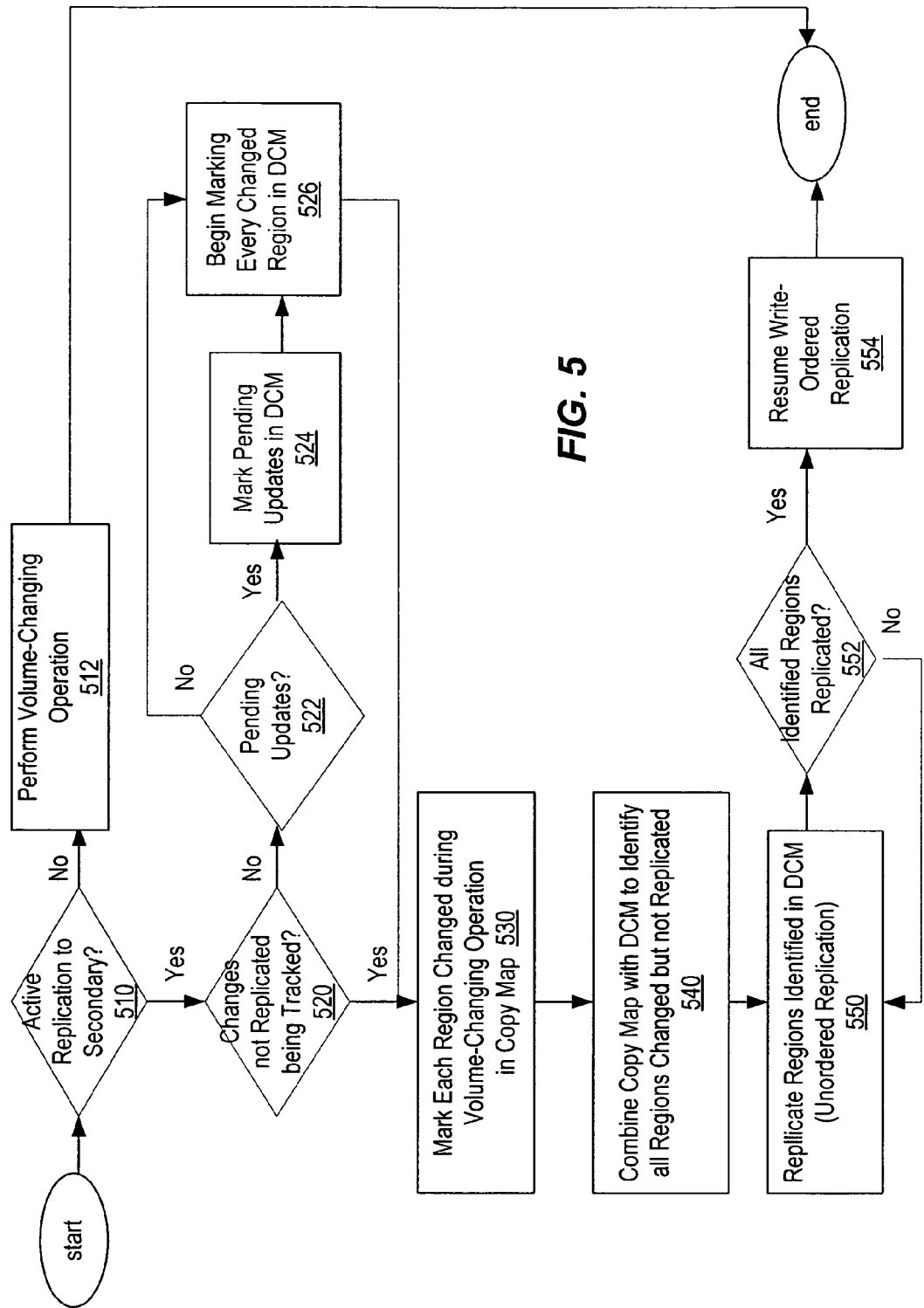
FIG. 5 shows a flowchart of operation of the replication facility of FIG. 4 in performing a volume-changing operation, such as a restoration operation, in accordance with one embodiment of the present invention.

FIG. 5 shows a flowchart of the operation of replication facility 430A of FIG. 4 in performing a volume-changing operation, such as a restoration operation, of a primary volume. In "Active Replication to Secondary" decision point 510, a determination is made whether replication is actively occurring to a given secondary node. If replication is not actively occurring to that given secondary node, the volume-changing operation can proceed normally since there is no question of maintaining consistency of the data on that secondary node. Control proceeds to "Perform Volume-Changing Operation" step 512, where the volume-changing operation is performed.

If at "Active Replication to Secondary" decision point 510, the primary data are being replicated to that given secondary node, the volume-changing operation may affect a region that would not be captured during the normal replication process that is driven by application-initiated writes to the primary data. Control proceeds to "Changes not Replicated Being Tracked" decision point 520, where a determination is made whether changes made to regions of the primary data that are not replicated are already being tracked. The example of FIG. 5 assumes that changes made to the primary data that are not captured during the normal replication process are captured in a DCM, although it is not a requirement that the changes are tracked in a DCM or in any particular form, as long as the regions changed but not captured during replication can be identified.

At "Changes not Replicated Being Tracked" decision point 520, if changes are not currently being tracked, the DCM (or other regional tracking mechanism) should be initialized to reflect any regions that have changed and been queued for replication but for which replication will not be completed. Control proceeds to "Pending Updates" decision point 522 where a determination is made whether any such updates are queued for replication; for example, such changes would be present in the SRL but not yet replicated. If pending updates exist, control proceeds to "Mark Pending Updates in DCM" step 524, where any regions with pending updates are marked in the DCM such that those regions will be captured during later replication (for example, during a DCM replay operation). From either "Pending Updates" decision point 522 when no pending updates exist, or from "Mark Pending Updates in DCM" step 524, control proceeds to "Begin Marking Every Changed Region in DCM" step 526, where every region subsequently changed is marked in the DCM. Beginning to mark each region in the DCM indicates a transition from application-initiated write-ordered replication to unordered replication of regions that are marked in the DCM. By marking all regions changed in the DCM from this point forward, any region changed by either the volume-changing operation or by a normal application write operation is captured via the unordered replication until all regions are synchronized. Replication of regions marked in the DCM is also referred to as performing a "DCM replay" operation or as being in "DCM logging mode."

If changes are currently being tracked at "Changes not Replicated Being Tracked" decision point 520, no pending updates exist at "Pending Updates" decision point 522, or after "Begin Marking Every Changed Region in DCM" step 526, control proceeds to "Mark Each Region Changed during Volume-Changing Operation in Copy Map" step 530. Each region changed during the volume-changing operation is marked to indicate that the region must be synchronized to ensure consistency between the primary and secondary volumes.

Control then proceeds to "Combine Copy Map with DCM to Identify all Regions Changed but not Replicated" step 540. Regions modified by the current volume-changing operation (for example, regions affected by the restore operation) as tracked by the copy map for the volume-changing operation are combined with regions marked on the DCM due to SRL overflow, pending updates not yet replicated, or new application write operations. The copy map and DCM are combined by performing an OR operation of the values for each region. Once all affected regions are identified by combining the copy map with the DCM, the primary and secondary volumes can be synchronized by copying only the identified regions in "Replicate Regions Identified in DCM (Unordered Replication)" step 550. This synchronization operation can be performed by performing a DCM replay for all regions marked in the DCM as a result of the OR operation in "Combine Copy Map with DCM to Identify all Regions Changed but not Replicated" step 540.

From "Replicate Regions Identified in DCM (Unordered Replication)" step 550, control proceeds to "All Identified Regions Replicated" decision point 552. If all regions have been replicated, control proceeds to "Resume Write-Ordered Replication" step 554, where each application-initiated write operation is replicated as the write operation occurs. If all regions have not yet been replicated, control returns to "Replicate Regions Identified in DCM (Unordered Replication)" step 550 to continue unordered replication until all regions in the DCM are replicated.

In one embodiment of the invention, if the primary data are actively being replicated at "Active Replication to Secondary" decision point 510, but changes are not being tracked at "Changes not Replicated Being Tracked" decision point 520, the restore operation fails. The communication link can be made inactive before the primary volume is restored to ensure that a full resynchronization of the secondary volume is enforced.

On the secondary node, a restoration operation can be allowed if the communication link is inactive, (e.g., DETACHED or FAILED), since in that case there is no question of consistency with the primary data. In other situations, the restoration of volumes under a replication storage group/ replication volume group can be disallowed on the secondary node.

One possible use of a selective synchronization such as that described herein occurs when the primary data suffers a logical data corruption and needs to be restored to some known 'good' state in an older snapshot residing on the primary node. The restoration changes are propagated from the 'good' state on the primary node to the secondary node to return the secondary node to a consistent state. This technique can be used to quickly roll-back both the primary and secondary from a logical data corruption.

Another possible use of a selective synchronization such as that described herein is to restore the primary data to a state represented by a 'good' snapshot residing on a secondary volume. The primary role can be migrated temporarily to the secondary node that has the 'good' snapshot, and a restoration operation of the primary data from the 'good' snapshot can be used to mark the regions being restored into the DCM. Once the re-synchronization is completed, the former primary node can resume its role as primary node, with the state of the replication storage group/replication volume group being the state formerly maintained as the 'good' snapshot.

The functionality for detecting and capturing changes to a storage volume to ensure consistency of all storage volumes can be implemented in a multi-node environment using a variety of computer systems and networks. An example of one such computing and network environment is described below with reference to FIGS. 6 and 7.

An Example Computing and Network Environment

Figure 6:
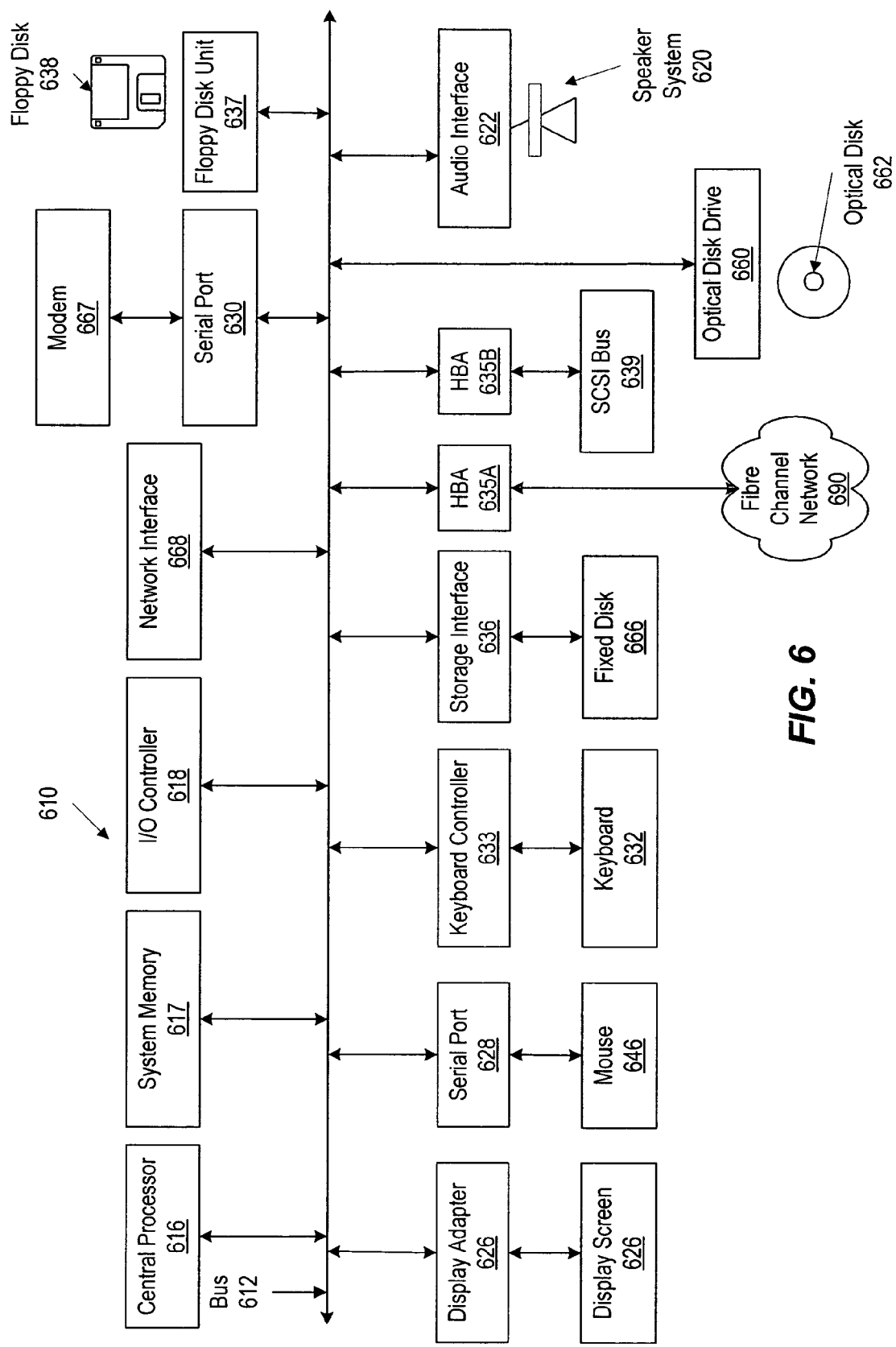
FIG. 6 shows an example of a computer system that can be used to practice the present invention.

FIG. 6 depicts a block diagram of a computer system 610 suitable for implementing the present invention. Computer system 610 includes a bus 612 which interconnects major subsystems of computer system 610, such as a central processor 614, a system memory 617 (typically RAM, but which may also include ROM, flash RAM, or the like), an input/output controller 618, an external audio device, such as a speaker system 620 via an audio output interface 622, an external device, such as a display screen 624 via display adapter 626, serial ports 628 and 630, a keyboard 632 (interfaced with a keyboard controller 633), a storage interface 634, a floppy disk drive 637 operative to receive a floppy disk 638, a host bus adapter (HBA) interface card 635A operative to connect with a fibre channel network 690, a host bus adapter (HBA) interface card 635B operative to connect to a SCSI bus 639, and an optical disk drive 640 operative to receive an optical disk 642. Also included are a mouse 646 (or other point-and-click device, coupled to bus 612 via serial port 628), a modem 647 (coupled to bus 612 via serial port 630), and a network interface 648 (coupled directly to bus 612).

Bus 612 allows data communication between central processor 614 and system memory 617, which may include read-only memory (ROM) or flash memory (neither shown), and random access memory (RAM) (not shown), as previously noted. The RAM is generally the main memory into which the operating system and application programs are loaded and typically affords at least 66 megabytes of memory space. The ROM or flash memory may contain, among other code, the Basic Input-Output system (BIOS) which controls basic hardware operation such as the interaction with peripheral components. Applications resident with computer system 610 are generally stored on and accessed via a computer readable medium, such as a hard disk drive (e.g., fixed disk 644), an optical drive (e.g., optical drive 640), floppy disk unit 637 or other storage medium. Additionally, applications may be in the form of electronic signals modulated in accordance with the application and data communication technology when accessed via network modem 647 or interface 648.

Storage interface 634, as with the other storage interfaces of computer system 610, may connect to a standard computer readable medium for storage and/or retrieval of information, such as a fixed disk drive 644. Fixed disk drive 644 may be a part of computer system 610 or may be separate and accessed through other interface systems. Modem 647 may provide a direct connection to a remote server via a telephone link or to the Internet via an interne service provider (ISP). Network interface 648 may provide a direct connection to a remote server via a direct network link to the Internet via a POP (point of presence). Network interface 648 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 6 to be present to practice the present invention. The devices and subsystems may be interconnected in different ways from that shown in FIG. 6. The operation of a computer system such as that shown in FIG. 6 is readily known in the art and is not discussed in detail in this application. Code to implement the present invention may be stored in computer-readable storage media such as one or more of system memory 617, fixed disk 644, optical disk 642, or floppy disk 638. Additionally, computer system 610 may be any kind of computing device, and so includes personal data assistants (PDAs), network appliances, X-window terminals or other such computing devices. The operating system provided on computer system 610 may be MS-DOS®, MS-WINDOWS®, OS/2®, UNIX®, Linux®, or another known operating system. Computer system 610 also supports a number of Internet access tools, including, for example, an HTTP-compliant web browser having a JavaScript interpreter, such as Netscape Navigator®, Microsoft Explorer®, and the like.

Figure 7:
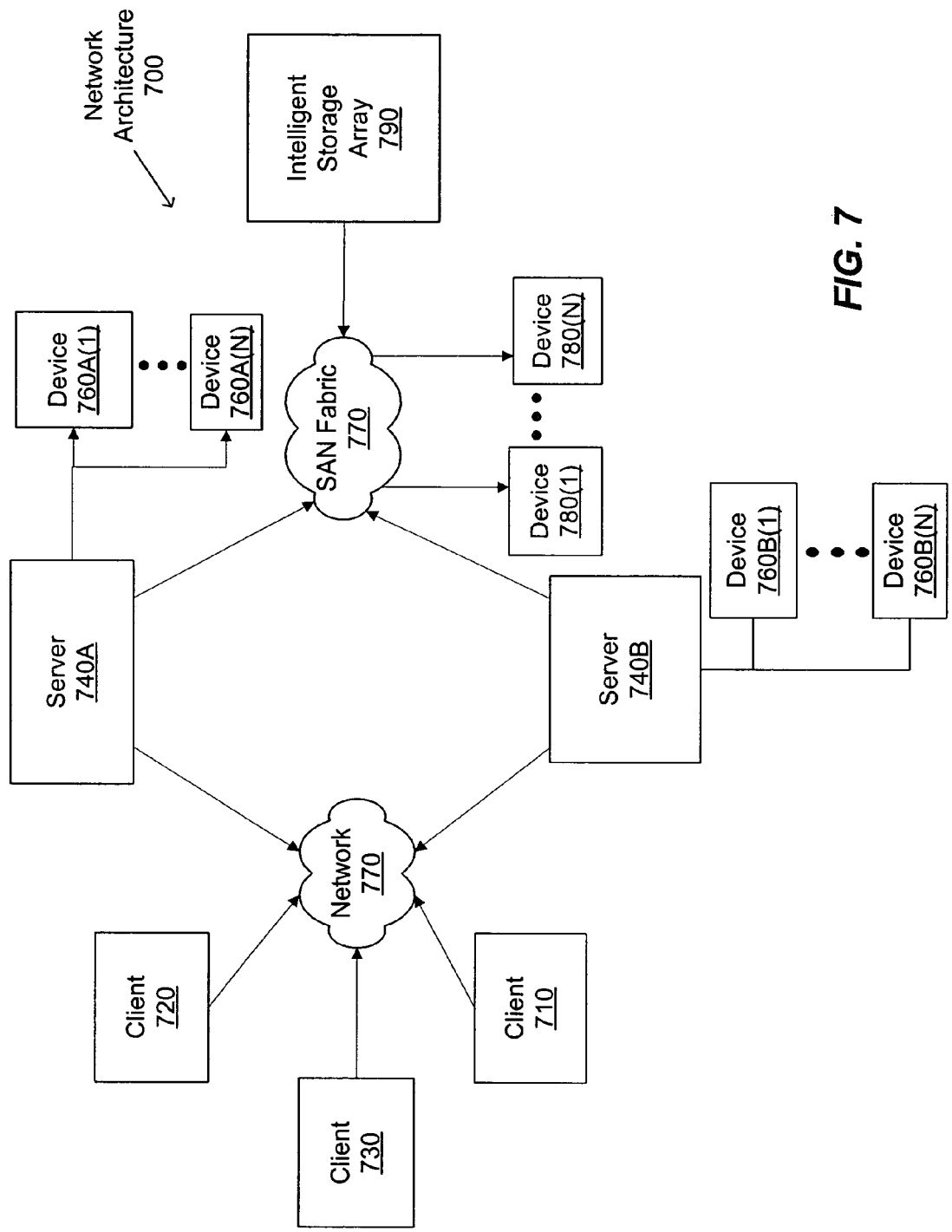
FIG. 7 is an example of a network environment in which the present invention may be practiced.

FIG. 7 is a block diagram depicting a network architecture 700 in which client systems 710, 720 and 730, as well as storage servers 740A and 740B (any of which can be implemented using computer system 410), are coupled to a network 750. Storage server 740A is further depicted as having storage devices 760A(1)-(N) directly attached, and storage server 740B is depicted with storage devices 760B(1)-(N) directly attached. Storage servers 740A and 740B are also connected to a SAN fabric 770, although connection to a storage area network, is not required for operation of the invention. SAN fabric 770 supports access to storage devices 780(1)-(N) by storage servers 740A and 740B, and so by client systems 710, 720 and 730 via network 750. Intelligent storage array 790 is also shown as an example of a specific storage device accessible via SAN fabric 770.

With reference to computer system 610, modem 647, network interface 648 or some other method can be used to provide connectivity from each of client computer systems 710, 720 and 730 to network 750. Client systems 710, 720 and 730 are able to access information on storage server 740A or 740B using, for example, a web browser or other client software (not shown). Such a client allows client systems 710, 720 and 730 to access data hosted by storage server 740A or 740B or one of storage devices 760A(1)-(N), 760B(1)-(N), 780(1)-(N) or intelligent storage array 760. FIG. 7 depicts the use of a network such as the Internet for exchanging data, but the present invention is not limited to the Internet or any particular network-based environment.

One of skill in the art will recognize that different physical network configurations can be used to implement the communication links between nodes and between nodes and storage. For example, the node-to-node communication links and node-to-storage links may communicate over physically separate networks, such as a node-to-node link over an Ethernet Transmission Control Protocol/Internet Protocol (TCP/IP) network and the node-to-storage links over a separate fibre channel storage area network (SAN). Different protocols are typically used for communicating storage information than the protocols used to communicate between nodes, although the use of different protocols is not a requirement of the invention.

In an alternative implementation, both the node-to-node links and the node-to-storage links can be implemented over the same physical network if that network can carry both input/output (I/O) storage communication and inter-node communication simultaneously. Examples of such implementations are TCP/IP over an underlying fibre channel storage area network (SAN), a multiplexing of multiple protocols over Infiniband (IB), or a storage protocol such as Internet Small Computer System Interface (iSCSI) layered over TCP/IP on an Ethernet network supporting a high bit rate (i.e., one to ten gigabits per second (Gbps)).

Moreover, regarding the signals described herein, those skilled in the art will recognize that a signal may be directly transmitted from a first block to a second block, or a signal may be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of computer system 610). It is to be understood that such depicted architectures are merely examples, and that, in fact, many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention. Consequently, the invention is intended to be limited only by the scope of the appended claims, giving full cognizance to equivalents in all respects.

What is claimed is:

1. A method comprising:
   replicating data from a first volume to a second volume, wherein
      the replicating comprises copying to the second volume only data from regions of the first volume that are modified by application-driven update operations, and
      the application-driven update operations are initiated by an application managing data in the first volume;
   while the replicating the data from the first volume is being performed, detecting a change to a first region of the first volume, wherein
      the change is caused by a restore operation to restore the first volume from a third volume,
      the restore operation is not an application-driven update operation initiated by the application,
      the change is detected by detecting the restore operation and accessing a restoration data structure,
      the restoration data structure identifies regions of the first volume that are not synchronized with the third volume, and
      the change to the first region caused by the restore operation is not designated for replication from the first volume to the second volume at the time of the detecting;
   in response to the detecting, adding information identifying the first region to a replication data structure, wherein
      the adding comprises combining the replication data structure with the restoration data structure,
      the replication data structure identifies regions of the first volume that are designated for replication to the second volume,
      the regions of the first volume designated for replication to the second volume are regions of the first volume that are modified by application-driven update operations and the first region of the first volume changed by the restore operation, and
      the adding is performed while the replicating is being performed; and
   in response to the adding the information to the replication data structure, replicating data modified by the restore operation from the first region of the first volume to the second volume, wherein
      the replicating the data from the first region is performed while the replication of the data modified by the application-driven update operations from the first volume is ongoing, and
      the replicating the data from the first volume, the detecting, the adding, and the replicating the data from the first region are performed by a computing device implementing a replication facility.

2. The method of claim 1 wherein the third volume is a snapshot of the first volume at one point in time.

3. The method of claim 1 wherein the first volume is accessible by the application during the replicating.

4. The method of claim 1 wherein the first volume is accessible by the application while being restored from the third volume.

5. A system comprising:
   a processor;

computer-implemented means for replicating data from a first volume to a second volume, wherein
  the replicating comprises copying to the second volume only data from regions of the first volume that are modified by application-driven update operations, and
  the application-driven update operations are initiated by an application managing data in the first volume;
computer-implemented means for detecting a change to a first region of the first volume while the data is being replicated from the first volume, wherein
  the change is caused by a restore operation to restore the first volume from a third volume, and
  the restore operation is not an application-driven update operation initiated by the application,
  the change is detected by detecting the restore operation and accessing a restoration data structure,
  the restoration data structure identifies regions of the first volume that are not synchronized with the third volume, and
  the change to the first region caused by the restore operation is not designated for replication from the first volume to the second volume at the time of the detecting;
computer-implemented means for, in response to detection of the change, adding information identifying the first region to a replication data structure, wherein
  the information is added to the replication data structure by combining the replication data structure with the restoration data structure,
  the replication data structure identifies regions of the first volume that are designated for replication to the second volume,
  the regions of the first volume designated for replication to the second volume are regions of the first volume that are modified by application-driven update operations and the first region of the first volume changed by the restore operation, and
  the information is added while the data is being replicated from the first volume; and
computer-implemented means for, in response to the addition of the information, replicating data modified by the restore operation from the first region of the first volume to the second volume, wherein
  the data from the first region is replicated while the data modified by the application-driven update operations is being replicated from the first volume.

6. A system comprising:
a processor; and
a memory coupled to the processor, wherein the memory stores program instructions executable by the processor to implement a replication facility, and wherein the replication facility is configured to:
replicate data from a first volume to a second volume by copying to the second volume only data from regions of the first volume that are modified by application-driven update operations, wherein
  the application-driven update operations are initiated by an application managing data in the first volume;
while data from the first volume is being replicated, detect a change to a first region of the first volume, wherein
  the change is caused by a restore operation to restore the first volume from a third volume,
  the restore operation is not an application-driven update operation initiated by the application,
  the change is detected by detecting the restore operation and accessing a restoration data structure,
  the restoration data structure identifies regions of the first volume that are not synchronized with the third volume, and
  the change to the first region caused by the restore operation is not designated for replication from the first volume to the second volume at the time of the detecting;
in response to detection of the change, add information identifying the first region to a replication data structure, wherein
  the information is added to the replication data structure by combining the replication data structure with the restoration data structure,
  the replication data structure identifies regions of the first volume that are designated for replication to the second volume,
  the regions of the first volume designated for replication to the second volume are regions of the first volume that are modified by application-driven update operations and the first region of the first volume changed by the restore operation, and
  the information is added while the data from the first volume is being replicated; and
in response to the addition of the information, replicate data modified by the restore operation from the first region of the first volume to the second volume, wherein
  the data modified by the restore operation from the first region is replicated while the data is being replicated from the first volume.

7. A computer-readable storage medium comprising program instructions executable to:
replicate data from a first volume to a second volume by copying to the second volume only data from regions of the first volume that are modified by application-driven update operations, wherein
  the application-driven update operations are initiated by an application managing data in the first volume;
while data from the first volume is being replicated, detect a change to a first region of the first volume, wherein
  the change is caused by a restore operation to restore the first volume from a third volume,
  the restore operation is not an application-driven update operation initiated by the application,
  the change is detected by detecting the restore operation and accessing a restoration data structure,
  the restoration data structure identifies regions of the first volume that are not synchronized with the third volume, and
  the change to the first region caused by the restore operation is not designated for replication from the first volume to the second volume at the time of the detecting;
in response to detection of the change, add information identifying the first region to a replication data structure, wherein
  the information is added to the replication data structure by combining the replication data structure with the restoration data structure,
  the replication data structure identifies regions of the first volume that are designated for replication to the second volume,
  the regions of the first volume designated for replication to the second volume are regions of the first volume that are modified by application-driven update operations and the first region of the first volume changed by the restore operation, and the information is added while the data from the first volume is being replicated; and in response to the addition of the information, replicate data modified by the restore operation from the first region of the first volume to the second volume, wherein the data from the first region is replicated while the data modified by the application-driven update operations is being replicated from the first volume.

8. The method of claim 1, wherein the replication data structure comprises a log.

9. The method of claim 1, wherein the replication data structure comprises a replication bitmap, the restoration data structure comprises a restoration bitmap, and the replication data structure is combined with the restoration data structure by performing a logical OR operation to combine the replication bitmap with the restoration bitmap.

10. The method of claim 1, further comprising:

detecting a change to a second region of the first volume, wherein the change to the second region is caused by the restore operation, and the change to the second region is not being tracked; and causing the restore operation to fail, in response to the detecting.

11. The system of claim 6, wherein the replication data structure comprises a log.

12. The system of claim 6, wherein the replication data structure comprises a replication bitmap, the restoration data structure comprises a restoration bitmap, and the replication data structure is combined with the restoration data structure by performing a logical OR operation to combine the replication bitmap with the restoration bitmap.

13. The system of claim 6, wherein the replication facility is configured to:

detect a change to a second region of the first volume, wherein the change to the second region is caused by the restore operation, and the change to the second region is not being tracked; and cause the restore operation to fail, in response to detecting the change to the second region at a time at which the second region is not being tracked.

14. The computer readable storage medium of claim 7, wherein the replication, data structure comprises a log.

15. The computer readable storage medium of claim 7, wherein the replication data structure comprises a replication bitmap, the restoration data structure comprises a restoration bitmap, and the replication data structure is combined with the restoration data structure by performing a logical OR operation to combine the replication bitmap with the restoration bitmap.

16. The computer readable storage medium of claim 7, wherein the program instructions are executable to:

detect a change to a second region of the first volume, wherein the change to the second region is caused by the restore operation, and the change to the second region is not being tracked; and cause the restore operation to fail, in response to detecting the change to the second region at a time at which the second region is not being tracked.

* * * * *